(12) United States Patent
Wang et al.

(10) Patent No.: US 10,003,254 B2
(45) Date of Patent: Jun. 19, 2018

(54) DIGITAL AC/DC POWER CONVERTER

(71) Applicant: Digital Power Company Limited, Grand Cayman (KY)

(72) Inventors: Calvin Shie-Ning Wang, Grand Cayman (KY); Zhen Qiu Huang, Grand Cayman (KY)

(73) Assignee: Digital Power Company Limited, Grand Cayman (KY)

( * ) Notice: Subject to any disclaimer, the term of this patent is extended or adjusted under 35 U.S.C. 154(b) by 0 days. days.

(21) Appl. No.: 15/874,884

(22) Filed: Jan. 19, 2018

(65) Prior Publication Data

US 2018/0145586 A1    May 24, 2018

Related U.S. Application Data

(62) Division of application No. 14/340,658, filed on Jul. 25, 2014, now Pat. No. 9,912,231.

(30) Foreign Application Priority Data

May 27, 2014   (CN) .......................... 2014 1 0225685

(51) Int. Cl.
*H02M 3/335*   (2006.01)
*H02M 1/42*    (2007.01)
*H02M 7/217*   (2006.01)
*H02M 1/00*    (2006.01)

(52) U.S. Cl.
CPC ........ *H02M 1/4225* (2013.01); *H02M 1/4258* (2013.01); *H02M 3/33515* (2013.01); *H02M 7/2176* (2013.01); *H02M 2001/007* (2013.01); *Y02B 70/126* (2013.01)

(58) Field of Classification Search
CPC ...... H02M 3/156; H02M 3/155; H02M 3/158; H02M 3/1582; H02M 3/1584; H02M 3/145; H02M 2003/1552; H02M 1/42; H02M 1/4208; H02M 1/12; H02M 1/4225; H02M 1/4233; H02M 1/4241; H02M 1/4258; H02M 1/425; H02M 2001/4283;

(Continued)

(56) References Cited

U.S. PATENT DOCUMENTS

2009/0080222 A1*   3/2009  Popescu ................. H02M 1/44
                                                      363/20
2012/0250360 A1*  10/2012  Orr ..................... H02M 3/3376
                                                      363/21.02

* cited by examiner

*Primary Examiner* — Nguyen Tran
*Assistant Examiner* — Bryan R Perez
(74) *Attorney, Agent, or Firm* — Chieh-Mei Wang

(57) ABSTRACT

A digital AC/DC power converter comprises an active PFC module, a single switch module having a single switch, a power output module having a transformer, a digital control module having a microcontroller, and a rectifying and filtering module having a full-bridge rectifier, an EMI filter, and a capacitor that is less than 1 µF. The single switch is electrically connected to the active PFC module, and a primary winding of the transformer is electrically connected to the active PFC module. The microcontroller provides a PWM signal to control the switching state of the single switch, so that the active PFC module transforms AC frequency from less than 300 Hz into over 30,000 Hz and outputs a rectified AC voltage waveform. The EMI filter blocks high electromagnetic frequencies and the capacitor smooths a variation in the rectified voltage waveform and output the smoothed rectified voltage waveform to the active PFC module.

9 Claims, 8 Drawing Sheets

(58) Field of Classification Search
CPC ... H02M 2001/4291; H02M 3/01; G05F 1/70; H02J 3/16
USPC .................. 363/205, 207, 222, 263, 289
See application file for complete search history.

DIGITAL AC/DC POWER CONVERTER

CROSS-REFERENCE TO RELATED APPLICATION

This application is a divisional of U.S. patent application Ser. No. 14/340,658, filed Jul. 25, 2014, which claims priority to Chinese patent application Ser. No. 201410225685.X, filed on May 27, 2014, the contents of which are incorporated herein by reference in their entirety.

FIELD OF THE INVENTION

The present invention relates generally to the design of a digital AC/DC power converter. More particularly, the present invention relates to utilizing a digital microcontroller to design a novel AC/DC power converter, so that the power factor (PF) of the AC/DC power converter is effectively improved.

BACKGROUND OF THE INVENTION

Power factor in power converters is defined as the ratio of the real power delivered to a load to the apparent power provided by a power source, and power converters should be able to deliver power from the power source to the load with high power factor.

Recently, government agencies gradually require power factors in power converters to exceed a certain minimum level by regulation. For example, Energy Star in U.S. requires power factors in power converter to achieve at least 87% if a specification of a device requires more than 49 W, such as notebooks. On the other hand, Energy Star in U.S. requires power factors in power converter to achieve no less than 68% if a specification of a device requires no more than 5 W, such as mobile phones.

Typically, power factor correction (PFC) is achieved through the use of specific analog integrated circuits (IC) especially designed for improving PFC in power converters. In addition, each of the aforementioned analog ICs varies in different application fields, thus lacking a generalized structure to adopt different designs in different application field.

For now, if a device requires more than 60 W, the function of PFC is usually achieved through the use of the aforementioned analog ICs in power converters. However, if a device requires no more than 65 W, the device usually does not have PFC function, since the price of power converters having the aforementioned analog ICs for improving PFC will be about or at least twice the price of power converters without PFC function.

In addition, the implementation of aforementioned conventional power converters usually requires complex circuitry further requiring considerable efforts to stabilize them. And once again, in different applications the power converters need to utilize different specific analog ICs to achieve high power factor correction.

In view of the above, there is a need for a power converter with non-complex circuitry that utilizes a common digital microcontroller that provides high PFC, and the digital microcontroller provides pulse width modulation (PWM) signal to control the power converter. The aforementioned digital microcontroller providing PWM signal is able to be regarded as a digital PWM controller.

BRIEF SUMMARY OF THE INVENTION

The invention provides a digital AC/DC power converter with a single switch working with a microcontroller to improve power factor. Specifically, the microcontroller is implemented by an at least 8-bit (such as 16-bit, 32-bit . . . etc) microprocessor so that the precision of duty cycle of a PWM signal generated from the microprocessor is expanded.

In one embodiment, a digital AC/DC power converter comprises an active PFC module, a single switch module, a power output module, a digital control module, and a rectifying and filtering module. The single switch module has a single switch electrically connected to the active PFC module. The power output module has a transformer, and a primary winding of the transformer is electrically connected to the active PFC module. The digital control module has a microcontroller that provides a PWM signal to control the switching state of the single switch, so that the active PFC module transforms an AC frequency from no more than 300 Hz into at least 30,000 Hz and outputs a rectified AC output voltage waveform to improve power factor. The rectifying and filtering module is electrically connected between an AC power source and the active PFC module, and has a full-bridge rectifier, an EMI filter; and a capacitor that is less than 1 μF. The EMI filter is electronically connected between the full-bridge rectifier and the capacitor, and the capacitor is connected to the active PFC module. The full-bridge rectifier is configured to turn an AC input from an AC power source into a rectified voltage waveform. The EMI filter is configured to block high electromagnetic frequencies, and the capacitor is configured to smooth a variation in the rectified voltage waveform from the full-bridge rectifier and output the smoothed rectified voltage waveform to the active PFC module.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

In accordance with common practice, the various described features are not drawn to scale and are drawn to emphasize features relevant to the present disclosure. Like reference characters denote like elements throughout the figures and text.

DETAILED DESCRIPTION OF THE INVENTION

Figure 1:
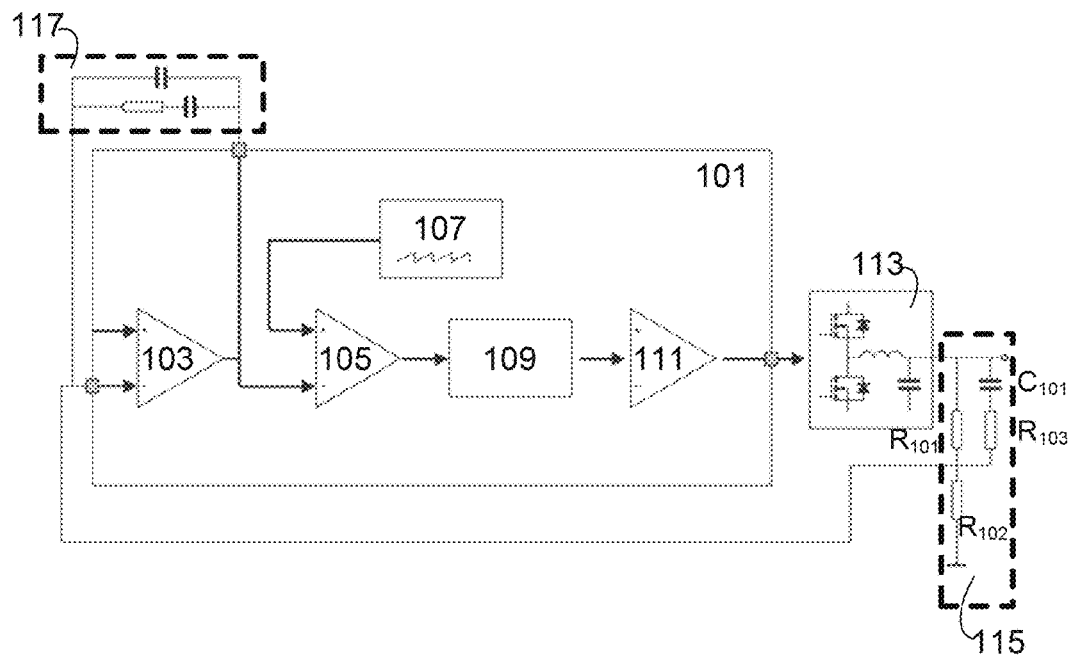
FIG. 1 is a comparison plot showing the difference between an analog PWM controller and a digital PWM controller.
Figure 1:
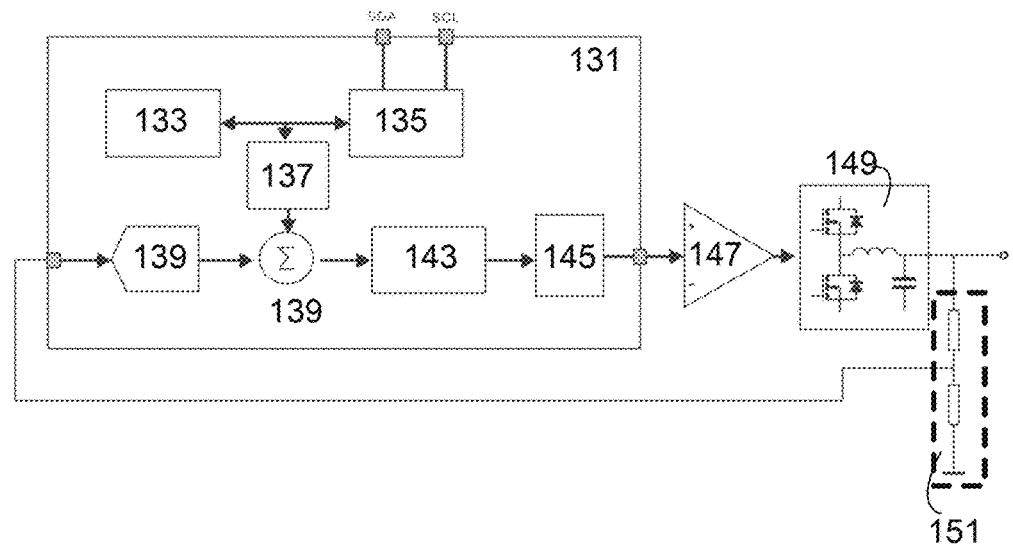

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present invention in conjunction with the accompanying drawings in FIGS. 1~8. Reference will be made to the drawing figures to describe the present invention in detail, wherein depicted elements are not necessarily shown to scale and wherein like or similar elements are designated by same or similar reference numeral through the several views and same or similar terminology.

FIG. 1 is a comparison plot showing the difference between an analog PWM controller and a digital PWM controller. Referring to FIG. 1, an analog PWM controller 101 generally has an error comparison unit 103, a calculation comparison unit 105, a ramp generator 107, a latch unit 109, and a driver unit 111. In addition, a power converter generally is able to have the analog PWM controller 101, a switch module 113, and auxiliary circuits 115 and 117.

The error comparison unit 103 has an amplifier and thus has a positive end to receive a reference voltage and a negative end to receive a feedback voltage that is provided from the auxiliary circuit 115. If the feedback voltage is higher than the reference voltage, the error will not be corrected. The feedback voltage is formed from a voltage divider having resistors $R_{101}$ and $R_{102}$ in the auxiliary circuits 115, and the auxiliary circuits 115 have a capacitor $C_{101}$ and a resistor $R_{103}$ to form a R-C circuit, thus providing a oscillation average value of an output waveform to the error comparison unit 103.

The calculation comparison unit 105 has an amplifier and thus has a positive end to receive an output signal from the ramp generator 107 and a negative end to receive an integrated signal that is formed by an output signal from the error comparison unit 103 and by an output signal from the auxiliary circuit 117. The auxiliary circuit 117 is a R-C circuit and receives the output signal from the auxiliary circuit 115 as well.

The calculation comparison unit 105 utilizes comparison method to obtain the variation of the pulse width and output a variable width pulse signal that is similar to a rectangular waveform. Then, to amplify the variable width pulse signal, the latch unit 109 receives the variable width pulse signal and output a variable width rectangular pulse to the driver unit 111. Typically, the output signal from the driver unit 111 is an amplified variable width rectangular pulse and its voltage needs to be higher than 5V so as to appropriately drive the switch module 113. The switch module 113 has at least one switch component, such as a MOSFET or an IGBT, and controls the DC output of the power converter.

On the other hand, referring to FIG. 1, a digital PWM controller 131 generally has a power management unit 133, a controller interface 135, a digital reference voltage unit 137, a A/D converter 139 (ADC), a digital adder 141, a digital PID filter 143, a digital PWM unit 145. In addition, a power converter generally is able to have the digital PWM controller 131, a driver unit 147, a switch module 149, and an auxiliary circuit 151.

The control interface 135 has a SDA interface for data communication and has a SCL interface for time/frequency communication. Thus, the digital reference voltage unit 137 is able to receive the signal from the power management unit 133 and the signal from the control interface 135, thus outputting a digital reference voltage to the digital adder 141. The digital adder 141 receives the signal from the ADC 139 and the signal from the digital reference voltage unit 137. The ADC 139 is able to convert an analog amount into a digital amount. For example, an analog IV signal is able to be converted to a 0~255 digital signal by the ADC 139, wherein digital 0 represents 0V and digital 255 represents IV. In addition, the ADC 139 receives a divided voltage formed by the resistors $R_{105}$, $R_{106}$ in the auxiliary circuit 151.

After calculation from the digital adder 141, the digital adder 141 outputs a signal to the digital PID filter 143, and the digital PID filter 143 outputs a variable width pulse signal that is similar to a rectangular waveform. Then, to amplify the variable width pulse signal, the digital PWM unit 145 receives the variable width pulse signal and output a variable width rectangular pulse to the driver unit 147, so that the driver unit 147 is able to appropriately drive the switch module 149. The switch module 149 has at least one switch component, such as a MOSFET or an IGBT, and controls the DC output of the power converter. Hence, if the power converter adopts a digital PWM controller 131, the power converter is able to be called a digital power converter.

Compared with the power converter having the analog PWM controller, the power converter having the digital PWM controller is advantageous in the following aspects: multiple interfaces/pins to proceed A/D conversion, multiple sampling and central control, flexibility, better complex control such as intelligent control or high-precision control, and overall costs.

Figure 2:
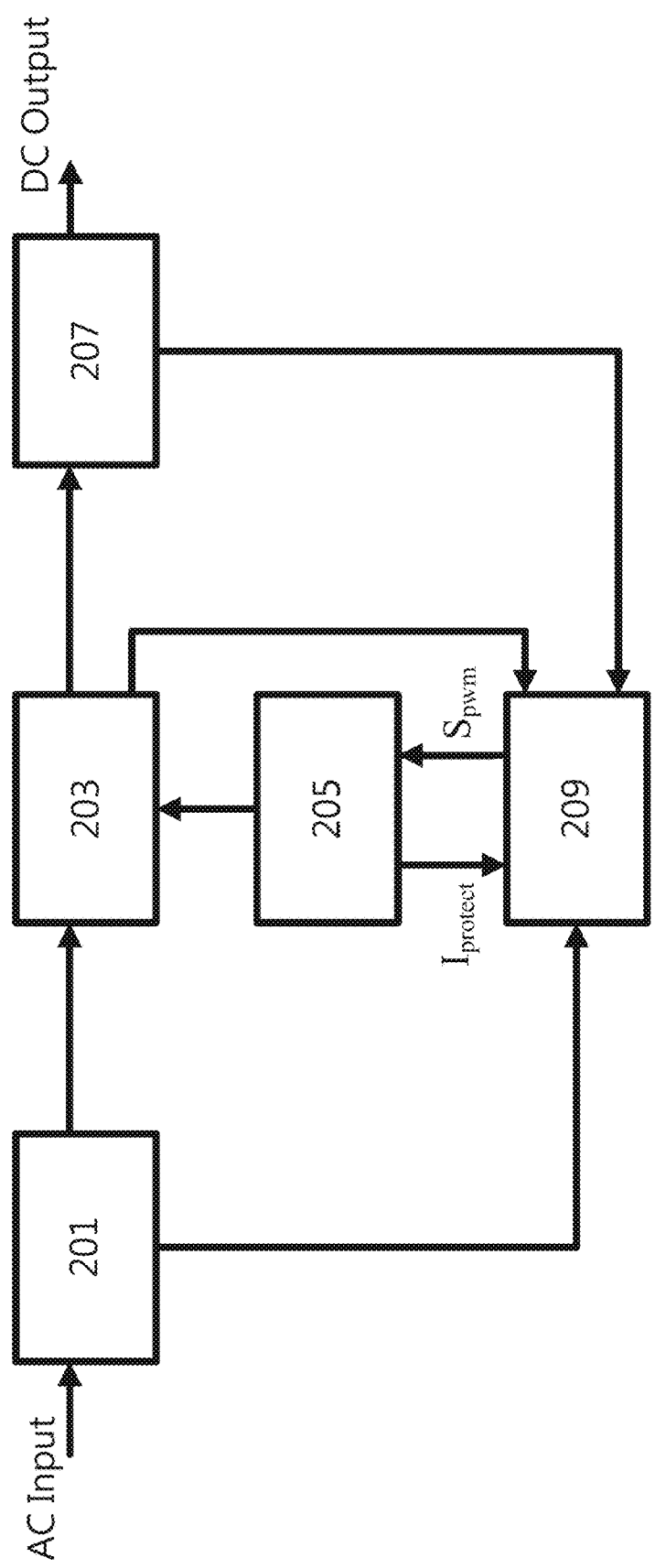
FIG. 2 is a block diagram of a low-power digital AC/DC power converter according to one embodiment of the present invention.

FIG. 2 is a block diagram of a low-power digital AC/DC power converter according to one embodiment of the present invention. Referring to FIG. 2, a digital power converter has a rectifying and filtering module 201, an active PFC module 203, a single switch module 205, a power output module 207, and a digital control module 209.

In, FIG. 2, the power transmission direction is from an AC input to a DC output sequentially via the rectifying and filtering module 201, the active PFC module 203, and the power output module 207.

The rectifying and filtering module 201 is electrically connected to the AC input, the active PFC module 203, and the digital control module 209. The active PFC module 203 is electrically connected to the rectifying and filtering module 201, the power output module 207, and the digital control module 209. The power output module 207 is electrically connected to the DC output, the active PFC module 203, and the digital control module 209. The single switch module 205 is electrically connected to the active PFC module 203 and the digital control module 209.

The digital control module 209 provides an amplified PWM signal $S_{pwm}$ to the single switch module 205 to control the ON/OFF switching state so that the single switch module 205 is able to output a digital PWM signal to the active PFC module 203. In addition, the single switch module 205 provides a feedback signal $I_{product}$ to control the output of the amplified PWM signal $S_{pwm}$, thus preventing potential damage of a single switch in the single switch module 205.

The rectifying and filtering module 201 provides a start-up signal to the digital control module 209 to start the digital AC/DC power converter. The power output module 207 provides a wake-up signal to the digital control module 209 to wake up the digital AC/DC power converter. In addition, the active PFC module 203 provides an internal voltage of the digital power converter as a feedback signal to the digital control module 209, so that the digital control module 209 detects the internal voltage and is able to control the duty cycle of the amplified PWM signal $S_{pwm}$.

Figure 3:
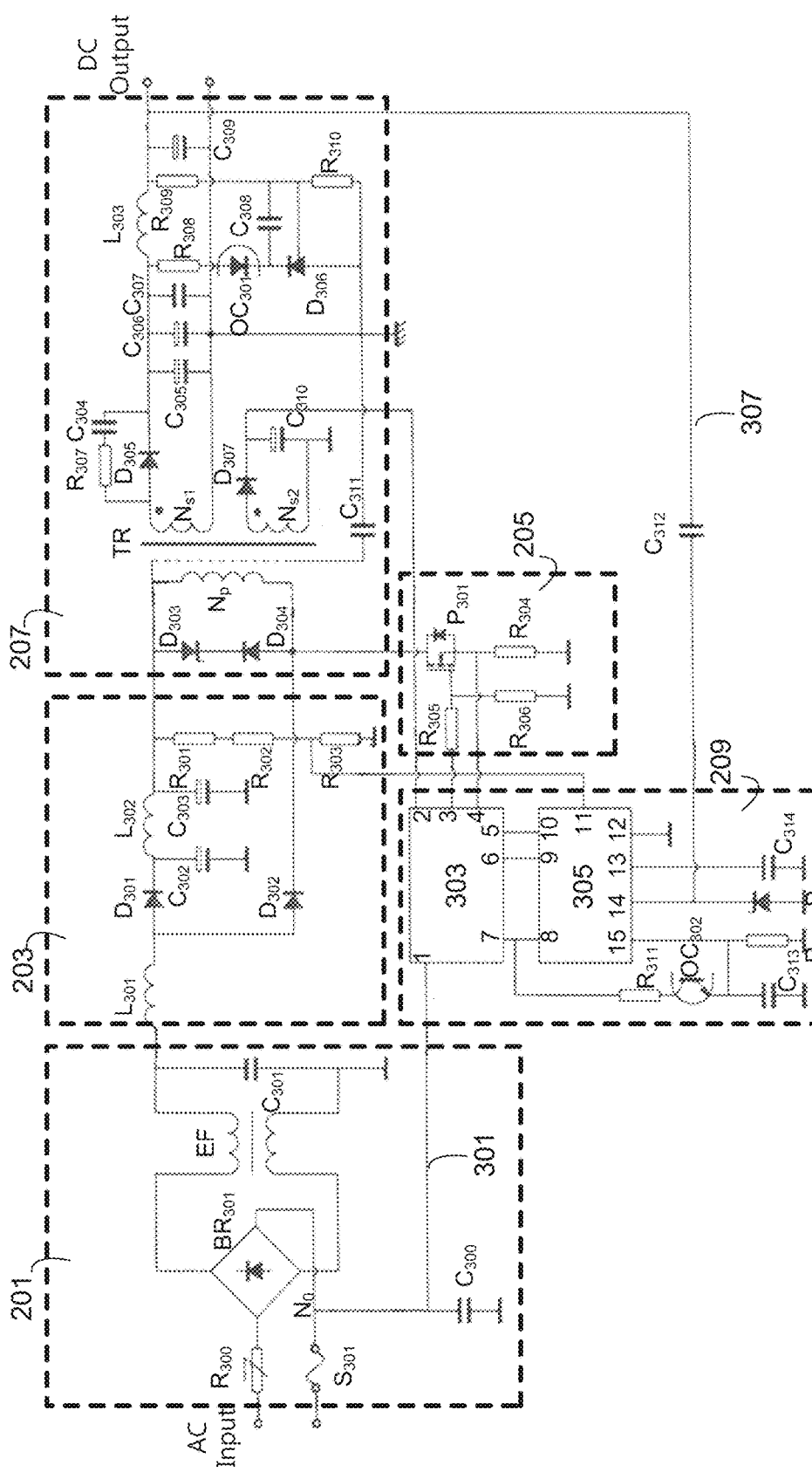
FIG. 3 is a schematic diagram of a low-power digital AC/DC power converter according to the embodiment of the present invention.

FIG. 3 is a schematic diagram of the low-power digital AC/DC power converter that illustrates more details of FIG. 2 according to one embodiment of the present invention. Referring to FIG. 3, the rectifying and filtering module 201 has a voltage dependent resistor (VDR) $R_{300}$, a fuse $S_{301}$, a full-bridge rectifier $BR_1$, an electromagnetic interference (EMI) filter EF, capacitors $C_{300}$ and $C_{301}$, and a start-up signal line 301. It should be noticed that the rectifying and filtering module 201 is connected to an AC power source for the AC input.

Typically, the frequency of the AC input is 50~60 Hz and the AC input is electrically connected to the voltage dependent resistor $R_{300}$ and the fuse $S_{301}$. The voltage dependent resistor $R_{300}$ is used to provide over-voltage protection, and the fuse $S_{301}$ is used to provide over-current protection. The full-bridge rectifier $BR_1$ makes use of four diodes in a bridge arrangement to achieve full-wave rectification that turns the AC input into a rectified voltage waveform. The EMI filter EF is used to block high electromagnetic frequencies that are recognized as noises.

The capacitor $C_{301}$ is used to smooth the variation in the rectified voltage waveform from full-bridge rectifier $BR_1$. However, the capacity of the capacitor $C_{301}$ is selected to be less than 1 μF and better ranges from 200 nF to 300 nF, thus merely filling a small part of the valley in the rectified voltage waveform and preventing low PFC caused by large $C_{301}$ capacity.

To decrease the power consumption of the standby state of the digital power converter, the start-up signal line 301 is responsible for transmitting the start-up signal and obtaining the signal from a half bridge of the full-bridge rectifier $BR_1$. Thus, the signal coming from a node $N_0$ is a half-wave rectified signal and is filtered by the capacitor $C_{300}$. The filtered signal in the start-up signal line 301 is provided to an auxiliary IC 303. While the digital power converter is electrically connected to the AC input, a start-up current is immediately formed and is transmitted from the node $N_0$ to the auxiliary IC 303 via the start-up signal line 301, thus enabling the digital power converter to work.

In FIG. 3, the active PFC module 203 has a boost circuit formed by an inductor $L_{301}$, a diode $D_{301}$ and a diode $D_{302}$, a π type filter formed by an inductor $L_{302}$, a capacitor $C_{302}$ and a capacitor $C_{303}$, and a voltage divider formed by resistors $R_{301}$, $R_{302}$ and $R_{303}$.

In the active PFC module 203, the diode $D_{302}$ can be regarded as a switch electrically connected to a power MOSFET $P_{301}$ in the single switch module 205, and the diode $D_{302}$ is controlled by the digital control module 209 electrically connected with the power MOSFET $P_{301}$. When the diode $D_{302}$ is switched to an ON state, the voltage of the left side of the inductor $L_{301}$ is higher than that of the right side of the inductor $L_{301}$, thus storing energy in a magnetic core surrounding by the inductor $L_{301}$. When the diode $D_{302}$ is switched to an OFF state, the voltage of the left side of the inductor $L_{301}$ is lower than that of the right side of the inductor $L_{301}$, thus releasing energy in the magnetic core through the inductor $L_{301}$. In addition, the diodes $D_{301}$ and $D_{302}$ may be high-frequency diodes.

In the active PFC module 203, when the diode $D_{301}$ is turned on, the voltage of the left side of the diode $D_{301}$ is higher than that of the right side of the diode $D_{301}$, thus storing the energy from the boost circuit to the capacitors $C_{302}$ and $C_{303}$.

Basically, the energy stored in the capacitors $C_{302}$ and $C_{303}$ is used to fill a large part of the valley in the rectified voltage waveform. It should be noticed that the rectified voltage waveform can be regarded as a low-frequency envelope of a high-frequency waveform created by the amplified PWM signal $S_{pwm}$ provided by the digital control module 209 since the amplified PWM signal $S_{pwm}$ turns the frequency below 300 Hz into at least 30,000 Hz by controlling the switch state of the diode $D_{302}$, wherein the frequency below 300 Hz is the frequency of AC input. For example, the frequency of the amplified PWM signal may be 60,000 Hz. Therefore, the switching of the diode $D_{302}$ turns the low-frequency state of the rectified voltage waveform into a high-frequency state, thus creating the rectified AC output voltage waveform with high-frequency.

The voltage divider formed by resistors $R_{301}$, $R_{302}$ and $R_{303}$ is used for a microcontroller 305 in the digital control module 209 to detect the internal voltage of the digital power converter. When the microcontroller 305 determines the power MOSFET $P_{301}$ not to work, the internal voltage is able to be proportional to input voltage from the AC power source. When the microcontroller 305 determines the power MOSFET $P_{301}$ to work, the detected voltage is able to be proportional to the voltage boosted by the boost circuit.

For example, when the power MOSFET $P_{301}$ is working, the microcontroller 305 is able to detect the peak voltage boosted by the boost circuit. If the peak voltage is higher than a specific threshold, the duty cycle of the switching of the power MOSFET $P_{301}$ will be adjusted by the microcontroller 305. The resistance value of the resistors $R_1$ and $R_2$ is able to be range from $10^5$ to $10^7 \Omega$, and the resistors $R_{301}$ and $R_{302}$ need to endure at least 440V.

In FIG. 3, the single switch module 205 has the power MOSFET $P_{301}$ and resistors $R_{304}$, $R_{305}$ and $R_{306}$, and the power MOSFET $P_{301}$ can be regarded as a single switch. The resistor $R_{304}$ is electrically connected to the source end of the power MOSFET $P_{301}$ and is also electrically connected to the auxiliary IC 303. In addition, the resistor $R_{304}$ is used to sample the current passing through the source end of the power MOSFET $P_{301}$. If the current passing through the source end is larger than a specific threshold, the digital control module 205 will not output the amplified PWM signal or will decrease the amplified PWM signal, thus protecting the power MOSFET $P_{301}$.

The resistor $R_{305}$ is electrically connected to the gate end of the power MOSFET $P_{301}$ and is also electrically connected to the auxiliary IC 303 in the digital control module 205. In addition, the resistor $R_{305}$ is used to transmit the amplified PWM signal $S_{pwm}$ provided by the digital control module 209. The resistor $R_{306}$ is electrically connected to the gate end of the power MOSFET $P_{301}$ and is also connected to the ground, thus preventing erroneous trigger of the power MOSFET $P_{301}$.

In FIG. 3, the power output module 207 has a transient voltage suppressor (TVS) $D_{303}$, a freewheeling diode (FWD) $D_{304}$, a transformer TR having a primary winding $N_p$, a $1_{st}$ secondary winding $N_{s1}$ and a $2_{nd}$ secondary winding $N_{s2}$, and an optical coupling circuit formed by an inductor $L_{303}$, resistors $R_{308}$, $R_{309}$ and $R_{310}$, an optical coupler $OC_1$, an diode $D_{306}$, and a capacitor $C_{308}$. In addition, the $1_{st}$ secondary winding $N_{s1}$ is electrically connected to a diode $D_{305}$, a R-C circuit having a resistor $R_{307}$ and a capacitor $C_{304}$, and capacitors $C_{305}$, $C_{306}$ and $C_{307}$. Moreover, the $2_{nd}$ secondary winding $N_{s2}$ is electrically connected to a diode $D_{307}$ and a capacitor $C_{310}$. It should be noticed that the power output module 207 further contains a capacitor $C_{309}$ and is connected to a DC load for the DC output.

The transient voltage suppressor (TVS) $D_{303}$ and the freewheeling diode (FWD) $D_{304}$ form an absorption circuit. When the power MOSFET $P_{301}$ is switched to an ON state, a magnetic core surrounding by the primary side of the transformer TR stores energy passed from the active PFC module 203. When the power MOSFET $P_{301}$ is switched to an OFF state, the magnetic core surrounding by the primary side of the transformer TR releases energy passed from the active PFC module 203, and thus the transient voltage suppressor $D_{303}$ and the freewheeling diode $D_{304}$ absorb the energy and inverse the direction of the magnetic field lines of the magnetic core surrounding by the primary side. Due to the aforementioned energy absorption, the transient voltage suppressor $D_{303}$ and the freewheeling diode $D_{304}$ dissipate the heat and eliminate instant high-frequency pulses.

The transformer TR is used to transform the voltage from the active PFC module 203 and provide isolation between the AC input and the DC output. The diode $D_{305}$ is used to provide rectification for the signal outputted from the $1_{st}$ secondary winding $N_{s1}$. The R-C circuit having the resistor $R_{307}$ and the capacitor $C_{304}$ is used to absorb high-frequency pulses, and the capacitors $C_{305}$, $C_{306}$ and $C_{307}$ is used for filtering, thus decreasing ripples of the signal outputted from the $1_{st}$ secondary winding $N_{s1}$. In addition, the $2_{nd}$ secondary winding $N_{s2}$ is used for providing a working voltage to the digital control module 209, so that all the components in the digital module 209 operate normally. For example, the auxiliary IC 303 is able to receive the working voltage provided by the $2_{nd}$ secondary winding $N_{s2}$, wherein the working voltage is able to range from 4~5V.

The optical coupling circuit formed by the inductor $L_{303}$, the resistors $R_{308}$, $R_{309}$ and $R_{310}$, the optical coupler $OC_{301}$, the diode $D_{306}$, and the capacitor $C_{308}$. The resistors $R_{308}$ and $R_{309}$ are used for voltage limitation, and the resistors $R_{309}$ and $R_{310}$ forms a voltage divider. The diode $D_{306}$ is used for precise voltage regulation. If the voltage provided by the voltage divider formed by the resistors $R_{309}$ and $R_{310}$ is higher than a specific threshold, the diode $D_{306}$ will be switched to an ON state. On the other hand, if the voltage provided by the voltage divider formed by the resistors $R_{309}$ and $R_{310}$ is lower than the specific threshold, the diode $D_{306}$ will be switched to an ON state. Hence, the diode $D_{306}$ decides whether the optical coupler $OC_{301}$ generates lights. If the voltage between the resistor $R_{308}$ and the diode $D_{306}$ is higher than a specific threshold, the optical coupler $OC_{301}$ generates lights, thus providing a feedback signal proportional to the output voltage to a microcontroller 305.

In FIG. 3, the digital control module 209 has the microcontroller 305, the auxiliary IC 303, and an optical coupling circuit formed by an optical coupler $OC_{302}$, resistors $R_{311}$ and $R_{312}$, and a capacitor $C_{313}$.

The auxiliary IC 303 can be regarded as a power management and driver IC. The auxiliary IC 303 has Pin 1 to sense the start-up signal, Pin 2 to sense the gate current of the power MOSFET $P_{301}$, Pin 3 to provide the amplified PWM signal to the power MOSFET $P_1$ for switching control, Pin 4 to obtain the working voltage from the $2_{nd}$ secondary winding $N_{s2}$, Pin 5 to receive an original PWM signal from the microcontroller 305, Pin 6 to communicate with the microcontroller 305, and Pin 7 to provide voltage for the microcontroller 305 to work. In addition, the communication via Pin 6 can be bi-directional and includes the function of detecting error signal of the auxiliary IC 303, confirming whether the auxiliary IC 303 is in a normal working mode.

On the other hand, the microcontroller 305 has Pin 8 to receive the working voltage provided from the auxiliary IC 303 to make it works, Pin 9 to communicate with the auxiliary IC 303, Pin 10 to provide the PWM signal to the auxiliary IC 303, Pin 11 to detect the internal voltage of the digital power converter, Pin 12 to connect the ground, Pin 13 reserved for other use, Pin 14 to receive a wake-up signal from the digital output module 207, and Pin 15 to receive a signal representing the output voltage from the optical coupling circuit of the digital control module 209.

In addition, the wake-up signal is transmitted via a wake-up signal line 307 that is designed for stand-by power mode. When the load connected with the DC output is in a system-off state, the design of the stand-by power in the digital power converter is able to save the power consumption of the load, reducing the original 1~3 W power consumption to no more than 100 mW power consumption. Thus, if the voltage of the DC output has a small variation, such as 100 mV variation caused by the plug-in of an USB, the microcontroller 305 will be waked up by the wake-up signal.

Due to the design of the power output module 207, the digital AC/DC power converter in FIG. 3 can be regarded as a fly-back type power converter.

Figure 4:
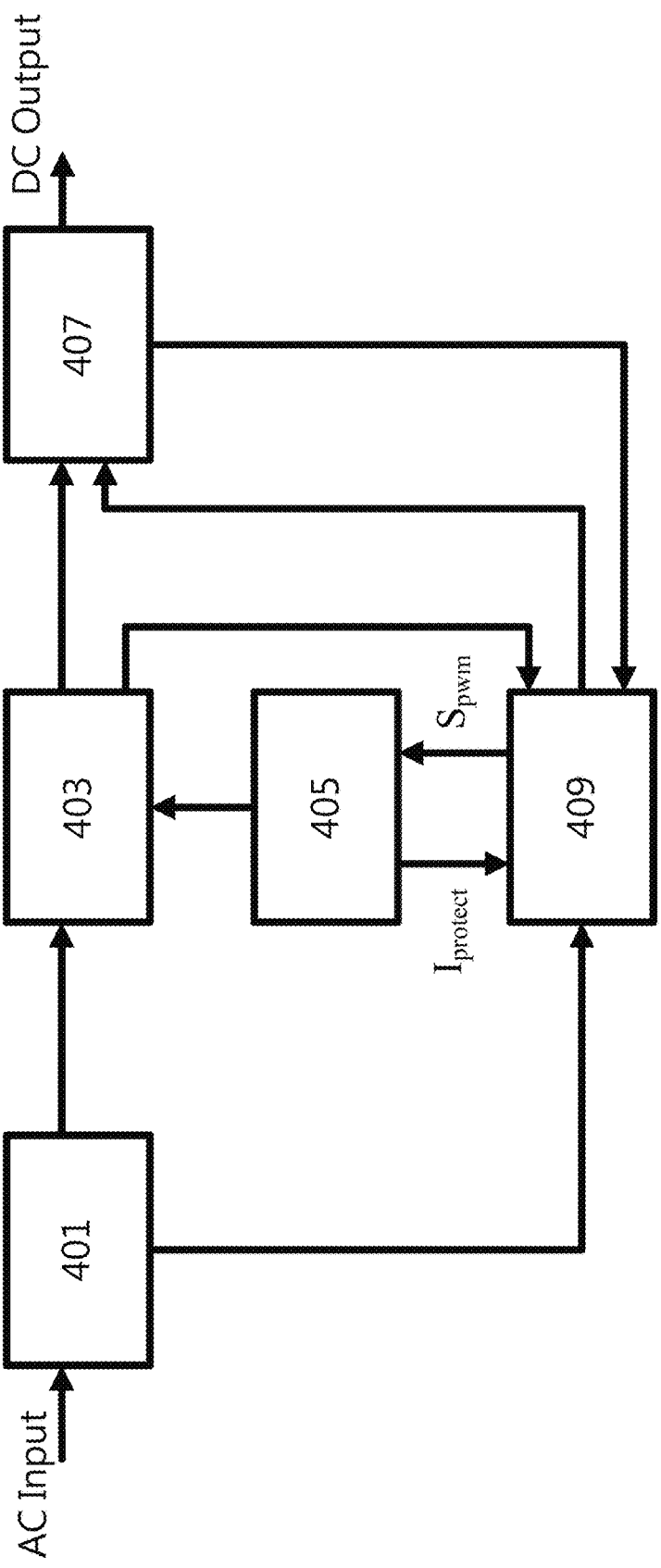
FIG. 4 is a block diagram of the middle/high-power digital AC/DC power converter according to another embodiment of the present invention.

FIG. 4 is a block diagram of the middle/high-power AC/DC digital power converter according to another embodiment of the present invention. Referring to FIG. 4, a digital power converter has a rectifying and filtering module 401, an active PFC module 403, a single switch module 405, a power output module 407, and a digital control module 409. The main difference between FIG. 2 and FIG. 4 is that the digital control module 409 provides additional control signal $S_{switch}$ to the power output module 407, thus creating a smart control scheme to fulfill the design of quasi-resonant soft switching in a zero voltage switch (ZVS) way and thus achieving the power conversion of middle/high power application. For example, the middle power application refers to the application utilizing power ranging from 80~200 W, and the high power application refers to the application utilizing power ranging no less than 200 W.

Figure 5:
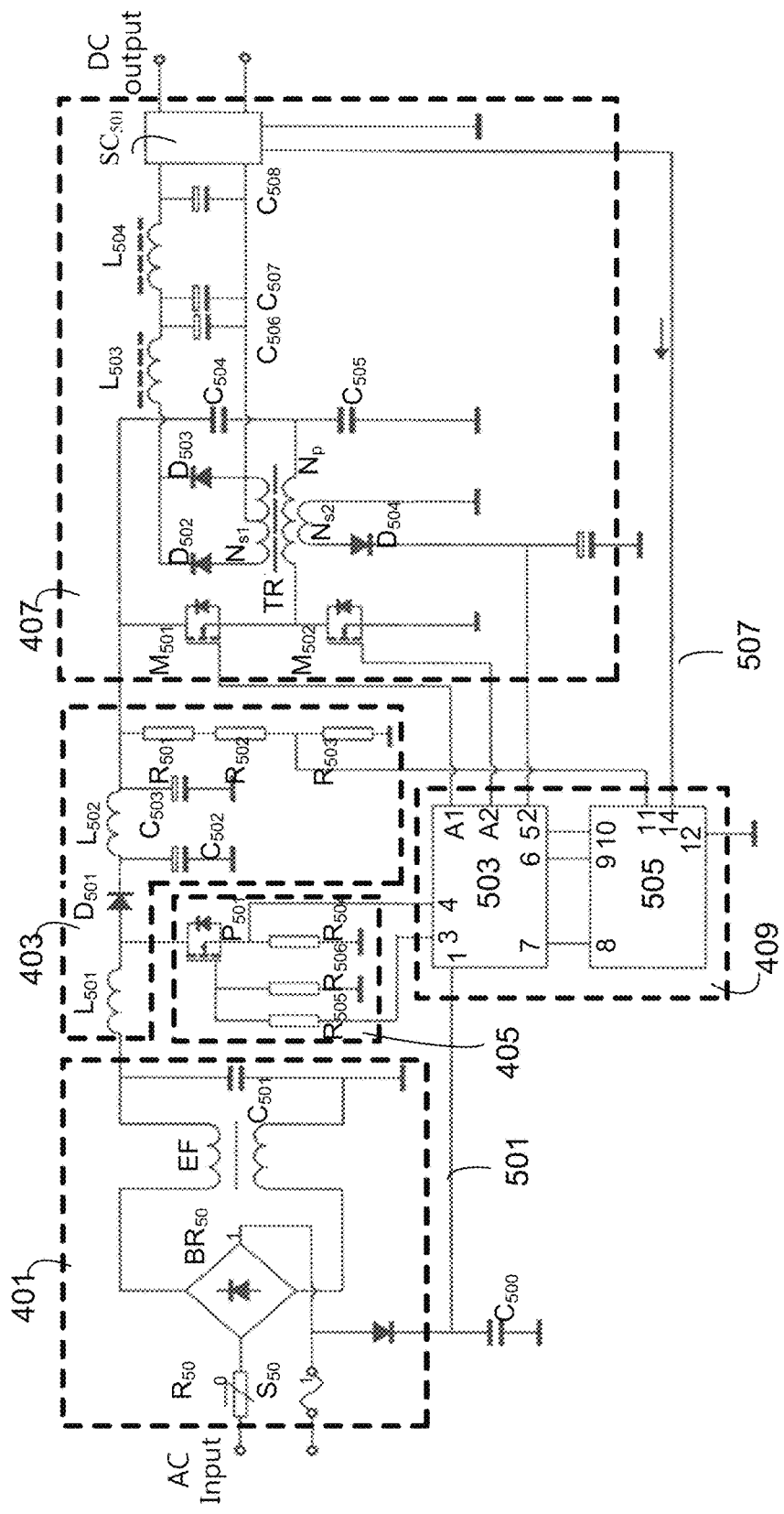
FIG. 5 is a schematic diagram of the middle-power digital AC/DC power converter according to the embodiment of the present invention.

FIG. 5 is a schematic diagram of the middle-power digital AC/DC power converter according to the embodiment of the present invention. The main difference between FIG. 5 and FIG. 3 is that the implementation of the power output module 407 in FIG. 5 is different from that of the power output module 207 in FIG. 3.

Referring to FIG. 5, the power output module 407 includes two switches $M_{501}$ and $M_{502}$ in series connection to ground. A microcontroller 505 controls an auxiliary IC 503 to output different rectangular pulses via Pin A1 and Pin A2, so that the switch $M_{502}$ maintains in an OFF state when the switch $M_{501}$ is switched to an ON state, and the switch $M_{501}$ maintains in an OFF state when the switch $M_{502}$ is switched to an ON state. Therefore, two switches $M_{501}$ and $M_{502}$ operate alternatively in an opposite working state. In addition, the switches $M_{501}$ and $M_{502}$ may not both operate in the ON state due to the connection to ground. Preferably, the switches $M_{501}$ and $M_{502}$ may be MOSFET.

In the aforementioned power output module 407, a transformer TR includes a primary winding $N_p$, a $1_{st}$ secondary winding $N_{s1}$ and a $2_{nd}$ secondary winding $N_{s2}$. The left side of the primary winding $N_p$ is electrically connected to the switches $M_{501}$ and $M_{502}$, and the right side of the primary winding $N_p$ is electrically connected to two capacitors $C_{504}$ and $C_{505}$.

When the switch $M_{501}$ is in an ON state and the switch $M_{502}$ is in an OFF state, the primary winding $N_p$ obtains energy from the capacitors $C_{504}$ and $C_{505}$. Meanwhile, the voltage in the left side of the primary winding $N_p$ is higher than and twice the voltage in the right side of the primary winding $N_p$, and the magnetic core surrounding by the primary side of the transformer TR stores energy.

When the switch $M_{501}$ is in the ON state and the switch $M_{502}$ is in the OFF state, if the switch $M_{501}$ is switched to an OFF state, the voltage in the left side of the primary winding $N_p$ will be changed to be lower than and half the voltage in the right side of the primary winding $N_p$. In this situation, both of the switch $M_{501}$ and the switch $M_{502}$ are in the OFF state.

When the switch $M_{501}$ is in the OFF state and the switch $M_{502}$ is in the OFF state, if the switch $M_{502}$ is switched to an ON state, the voltage in the left side of the primary winding $N_p$ will be changed to zero voltage and thus lower than the voltage in the right side of the primary winding $N_p$, thus changing the direction of saving energy in the magnetic core of the transformer TR. Since the direction of magnetic lines inverses immediately in the aforementioned situation, the magnetic core is not easy to saturate, thus improving working efficiency, the operation rate of the magnetic core and the conversion rate of energy.

Then, when the switch $M_{501}$ is in the OFF state and the switch $M_{502}$ is in the ON state, if the switch $M_{502}$ is switched to an OFF state, the switch $M_{501}$ will be prepared to switch to an ON state after the switching of the switch $M_{502}$. Therefore, a complete control cycle is achieved through the aforementioned switching process of $M_{501}$ and $M_{502}$ in FIG. 7. Therefore, the next start of the control cycle is to make the switch $M_{501}$ be switched to an ON state, so that the switch $M_{501}$ is in an ON state and the switch $M_{502}$ is in an OFF state.

In addition, the power output module 407 has two inductors $L_{503}$ and $L_{504}$. The inductor $L_{503}$ is used to store and release redundant energy, and the inductor $L_{504}$ is used to achieve filtering with a nearby magnetic core. Furthermore, the power output module 407 has a sampling circuit $SC_{501}$ for voltage sampling in constant voltage application or current sampling in constant current application.

Hence, the power output module 407 is designed to receive the smart control scheme of the microcontroller 505, thus making the digital power converter in the embodiment fulfill the design of quasi-resonant soft switching in a half-bridge zero-voltage-switch (ZVS) way.

Figure 6:
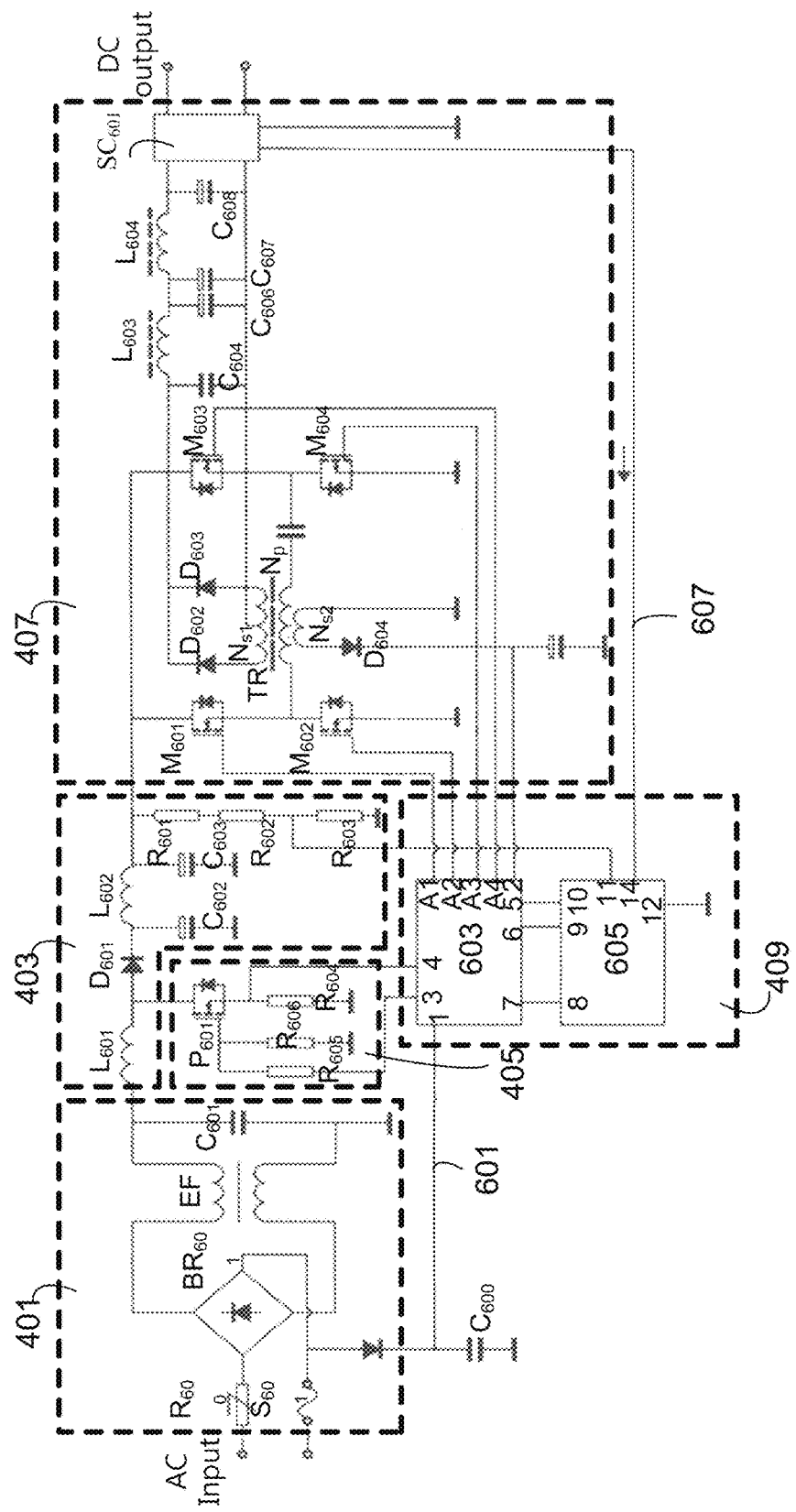
FIG. 6 is a schematic diagram of the high-power digital AC/DC power converter according to the embodiment of the present invention.
Figure 7:
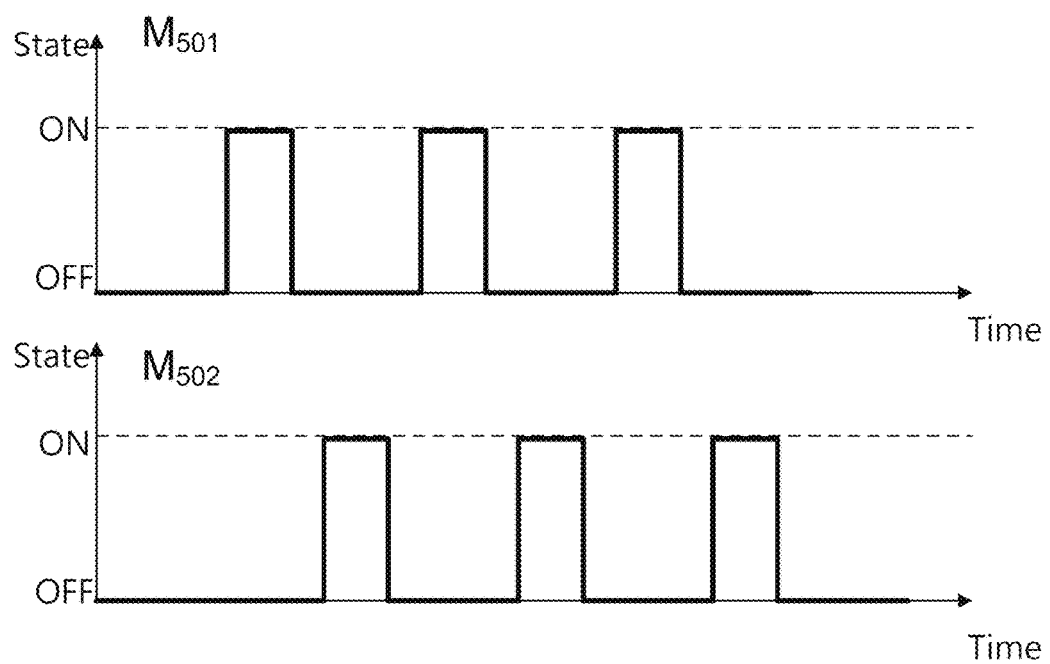
FIG. 7 is a soft-switching timing diagram of the middle-power digital AC/DC power converter according to the embodiment of the present invention.
Figure 8:
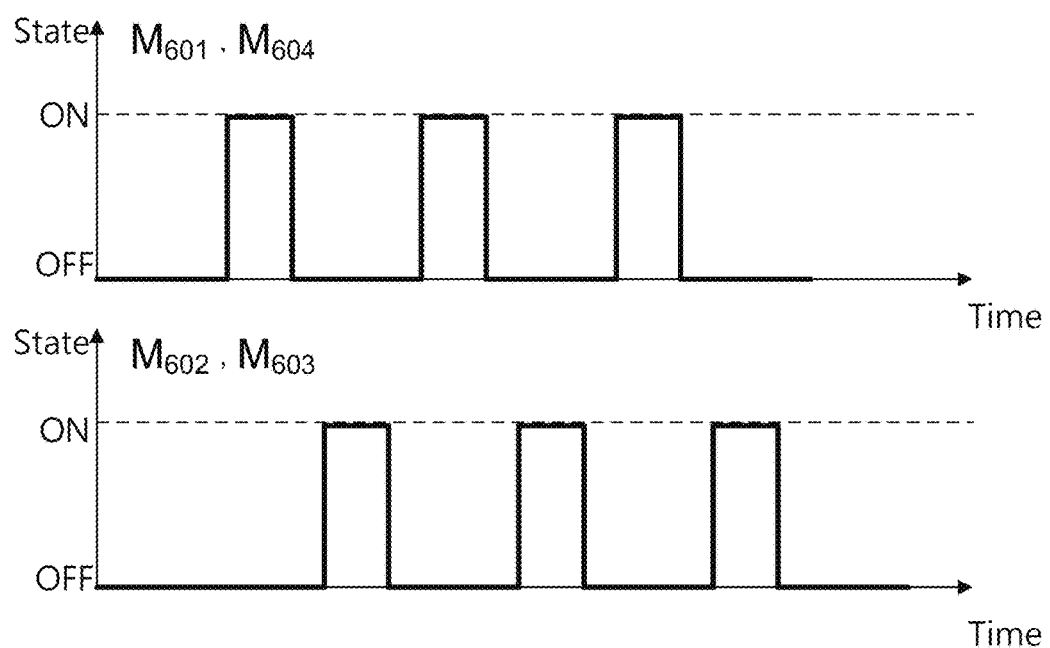
FIG. 8 is a soft-switching timing diagram of the high-power digital AC/DC power converter according to the embodiment of the present invention.

FIG. 6 is a schematic diagram of the high-power digital AC/DC power converter according to the embodiment of the present invention. The main difference between FIG. 6 and FIG. 5 is that the implementation of the power output module 607 in FIG. 6 is different from that of the power output module 507 in FIG. 5.

Referring to FIG. 6, the power output module 607 has four switches $M_{601}$, $M_{602}$, $M_{603}$ and $M_{604}$. The switches $M_{601}$ and $M_{502}$ are used to replace the capacitors $C_{504}$ and $C_{505}$ in FIG. 5. In the power output module 607, the switches $M_{601}$ and $M_{602}$ work in the same period of time and the switches $M_{603}$, $M_{604}$ work in another same period of time, respectively.

A microcontroller 605 controls an auxiliary IC 603 to output different rectangular pulses via Pins A1, A2, A3 and A4 to control the switches $M_{601}$, $M_{602}$, $M_{603}$, $M_{604}$, respectively, so that the switches $M_{602}$ and $M_{603}$ maintain in an OFF state when the switches $M_{601}$ and $M_{604}$ are switched to an ON state, and the switches $M_{601}$ and $M_{604}$ maintain in an OFF state when the switches $M_{602}$ and $M_{603}$ are switched to an ON state. Therefore, the switches: $M_{601}$ and $M_{604}$ and the switches: $M_{602}$ and $M_{603}$ operate alternatively in an opposite working state. Preferably, the switches $M_{601}$, $M_{602}$, $M_{603}$ and $M_{604}$ may be IGBT.

In the aforementioned power output module 607, a transformer TR includes a primary winding $N_p$, a $1_{st}$ secondary winding $N_{s1}$ and a $2_{nd}$ secondary winding $N_{s2}$. The left side of the primary winding $N_p$ is electrically connected to the switches $M_{601}$ and $M_{602}$, and the right side of the primary winding $N_p$ is electrically connected to the switches $M_{603}$ and $M_{604}$. In addition, the right side of the primary winding $N_p$ is electrically connected to a capacitor $C_{604}$ to isolate direct-current signal.

When the switches $M_{601}$ and $M_{604}$ are in an ON state and the switches $M_{602}$ and $M_{603}$ are in an OFF state, the voltage in the left side of the primary winding $N_p$ is higher than the voltage in the right side of the primary winding $N_p$. Then, if the switches $M_{601}$ and $M_{604}$ are switched to an OFF state, the voltage in the left side of the primary winding $N_p$ will be lower than the voltage in the right side of the primary winding $N_p$, and thus all the switches $M_{601}$, $M_{602}$, $M_{603}$ and $M_{604}$ are in an OFF state.

When all the switches $M_{601}$, $M_{602}$, $M_{603}$ and $M_{604}$ are in the OFF state, if the switches $M_{602}$, $M_{603}$ are switched to an ON state, the voltage in the left side of the primary winding $N_p$ will be changed to zero voltage and thus lower than the voltage in the right side of the primary winding $N_p$, thus changing the direction of saving energy in the magnetic core of the transformer TR. Since the direction of magnetic lines inverses immediately in the aforementioned situation, the magnetic core is not easy to saturate, thus improving working efficiency, the operation rate of the magnetic core and the conversion rate of energy.

Then, when the switches $M_{601}$ and $M_{604}$ are in the OFF state and the switches $M_{602}$ and $M_{603}$ are in the ON state, if the switches $M_{602}$ and $M_{603}$ are switched to an OFF state, the switches $M_{601}$ and $M_{604}$ will be prepared to switch to an ON state after the switching of the switches $M_{602}$ and $M_{603}$. Therefore, a complete control cycle is achieved through the aforementioned switching process in FIG. 8.

Hence, the power output module 607 is designed to receive the smart control scheme of the microcontroller 605, thus making the digital power converter in the embodiment fulfill the design of quasi-resonant soft switching a full-bridge zero-voltage-switch (ZVS) way.

An at least 8-bit microprocessor (such as 16-bit, 32-bit . . . etc) may be adopted to be microcontrollers 305, 505 and 605 in the aforementioned embodiments, thus expanding at least 64 times the precision of the duty cycle of the amplified PWM signal $S_{pwm}$ to precisely control the increase or decrease of the duty cycle. For example, if the voltage of DC output is higher than a specific threshold (which can be defined as too high), the aforementioned microprocessor is able to control to decrease the duty cycle of $S_{pwm}$, and if the voltage of DC output is lower than another specific threshold (which can be defined as too low), the aforementioned microprocessor is able to control to decrease the duty cycle of $S_{pwm}$. Therefore, the expansion of the precision is achieved by software implementation in a digital microprocessor and hardware structure of the digital power converter, and thus the cost of the overall digital AC/DC power converter is down with a high-precision control of the duty cycle of PWM.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A digital AC/DC power converter, comprising:
an active PFC module;
a single switch module having a single switch, wherein the single switch is electrically connected to the active PFC module;
a power output module comprising a transformer, the transformer having a primary winding, wherein the primary winding of the transformer is electrically connected to the active PFC module;
a digital control module having a microcontroller and electrically connected to the single switch module, wherein the microcontroller provides PWM signals to control the switching state of the single switch module, so that the active PFC module transforms an AC frequency from no more than 300 Hz into at least 30,000 Hz and outputs a rectified AC output voltage waveform to improve power factor; and
a rectifying and filtering module electrically connected between an AC power source and the active PFC module, the rectifying and filtering module comprising:
a full-bridge rectifier;
an EMI filter; and
a capacitor that is less than 1 µF;
the EMI filter being electronically connected between the full-bridge rectifier and the capacitor, and the capacitor being connected to the active PFC module, wherein the full-bridge rectifier is configured to turn an AC input from an AC power source into a rectified voltage waveform, the EMI filter is configured to block high electromagnetic frequencies and the capacitor is configured to smooth a variation in the rectified voltage waveform from the full-bridge rectifier and output the smoothed rectified voltage waveform to the active PFC module.

2. The digital AC/DC power converter of claim 1, wherein the rectifying and filtering module provides a start-up signal to the digital control module to start the digital AC/DC power converter.

3. The digital AC/DC power converter of claim 1, wherein the microcontroller is an at least 8-bit microprocessor that expands at least 64 times the precision of a duty cycle of the PWM signal.

4. The digital AC/DC power converter of claim 3, wherein digital control module further comprises an auxiliary integrated circuit, and the microprocessor provides the PWM signal to the auxiliary integrated circuit so that the auxiliary integrated circuit amplifies the PWM signal and provides an amplified PWM signal to the single switch module to control the switching state of the single switch.

5. The digital AC/DC power converter of claim 3, wherein the power output module further comprises a transient voltage suppressor and a freewheeling diode, and the transient voltage suppressor and the freewheeling diode are electrically connected to the primary winding of the transformer and are used to dissipate the heat and eliminate instant high-frequency pulses.

6. The digital AC/DC power converter of claim 3, wherein the power output module further comprises a secondary winding to provide a working voltage to the digital output module.

7. The digital AC/DC power converter of claim 3, wherein the power output module provides a wake-up signal to the digital control module to wake up the digital AC/DC power converter.

8. The digital AC/DC power converter of claim 3, wherein the active PFC module further comprises a boost circuit and a π type filter, and the boost circuit controls the energy output to the π type filter based on the switching of the single switch module.

9. The digital AC/DC power converter of claim 3, wherein the active PFC module further comprises a voltage divider that provides an internal voltage of the digital power converter to the digital control module, so that the digital control module controls the duty cycle of the PWM signal based on the internal voltage.

* * * * *